United States Patent
Boxhoorn et al.

(10) Patent No.: US 6,419,889 B1
(45) Date of Patent: Jul. 16, 2002

(54) CATALYST, PROCESS OF MAKING CATALYST AND PROCESS FOR CONVERTING NITROGEN OXIDE COMPOUNDS

(75) Inventors: Gosse Boxhoorn; Mark Crocker; Carl Johan Gerrit Van der Grift, all of Amsterdam (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 08/727,104

(22) Filed: Oct. 8, 1996

(30) Foreign Application Priority Data

Oct. 9, 1995 (GB) .......................................... 95202713

(51) Int. Cl.$^7$ .......................... B01D 53/54; B01D 53/60
(52) U.S. Cl. .................... 423/239.1; 502/305; 502/309; 502/312; 502/321; 502/350
(58) Field of Search ....................... 423/239.1; 502/309, 502/311, 350, 305, 312, 321, 353

(56) References Cited

U.S. PATENT DOCUMENTS

| 4,061,596 A | * | 12/1977 | Matsuhita | 502/439 |
| 4,113,660 A | * | 9/1978 | Abe | 502/340 |
| 4,138,469 A | * | 2/1979 | Kato | 423/239.1 |
| 4,833,113 A | * | 5/1989 | Imanari | 423/239.1 |
| 4,859,439 A | | 8/1989 | Rikimaru et al. | 423/239 |
| 4,891,348 A | * | 1/1990 | Imanari | 423/239.1 |
| 4,946,661 A | * | 8/1990 | Tachi | 423/239.1 |
| 4,952,548 A | * | 8/1990 | Kato | 423/239.1 |
| 5,106,549 A | | 4/1992 | Daamen et al. | 464/56 |
| 5,137,855 A | * | 8/1992 | Hegedus | 502/309 |
| 5,169,619 A | * | 12/1992 | Yoshimoto | 502/309 |
| 5,198,403 A | * | 3/1993 | Brand | 423/239.1 |
| 5,225,390 A | * | 7/1993 | Vogel | 502/309 |
| 5,827,489 A | * | 10/1998 | Garcin et al. | 423/239.1 |

FOREIGN PATENT DOCUMENTS

| DE | 3805564 | | 2/1988 | |
| DE | 6816599 | | 5/1988 | |
| DE | 3906136 | | 5/1989 | |
| DE | 4321555 | | 6/1993 | |
| EP | 0313755 | | 10/1987 | |
| EP | 0268265 | | 2/1988 | |
| EP | 0452619 | | 4/1990 | |
| EP | 0 260 614 B1 | | 7/1992 | ........... B01D/53/36 |
| EP | 0 516 262 A1 | | 12/1992 | ........... B01D/53/36 |
| EP | 643991 | * | 3/1995 | |
| SU | 1799287 | | 9/1990 | |

* cited by examiner

*Primary Examiner*—Wayne A. Langel
*Assistant Examiner*—Nanbel Medina Sanabria

(57) ABSTRACT

Catalyst comprising a titania carrier and one or more metal compounds which metals are selected from the group consisting of vanadium, molybdenum and tungsten, which catalyst has a surface area measured by nitrogen adsorption of between about 70 m$^2$/g and about 99 m$^2$/g, a process for preparing such catalyst, catalyst obtainable by such preparation process and a process for selectively converting nitrogen oxide compounds with the help of such catalyst.

9 Claims, No Drawings

CATALYST, PROCESS OF MAKING CATALYST AND PROCESS FOR CONVERTING NITROGEN OXIDE COMPOUNDS

FIELD OF THE INVENTION

The present invention relates to a catalyst, to a process for preparing such catalyst, to a catalyst obtainable by such preparation process and to a process for converting nitrogen oxide compounds with the help of such catalyst.

BACKGROUND OF THE INVENTION

It is known that nitrogen oxide compounds can be removed by selective catalytic reduction with the help of a reducing compound such as $NH_3$ in the presence of a catalyst.

In EP-B-260614 a process has been described for reduction of nitrogen oxide compounds with the help of a catalyst comprising titanium and vanadium, in which catalyst the concentration of vanadium in the surface layer is at least 1.5 times as much as the concentration of vanadium throughout the catalyst. It is described that such catalyst is resistant to deactivation or poisoning by arsenic compounds contained in waste gases together with nitrogen oxides. No indication has been given of the surface area of the catalysts. In the examples, the catalyst has been prepared in the form of a honeycomb. Honeycombs must have a high crushing strength, which makes that they generally have a relatively low surface area. A typical surface area for honeycombs, measured by nitrogen adsorption, is about 40 to 60 $m^2/g$.

EP-A-256359 relates to a catalyst for removing nitrogen oxides which catalyst contains a first group of pores having a diameter of 10 to less than 100 nm and a second group of many pores having a diameter of 100 to 12000 nm. The pore volume of the first group and the pore volume of the second group is at least 10% of the total pore volume of the first and second group. It is described that such catalyst is not easily poisoned by an arsenic compound and/or calcium compound. Surface areas as measured by nitrogen adsorption, have not been given. As the contact angle of the impregnated catalysts is not known, these surface areas can not be derived from the mercury intrusion data.

EP-A-516262 relates to titania based catalyst having such porosity that the catalyst comprises 0.05 to 0.5 $cm^3/cm^3$ in pores having a diameter of 60 nm or less, and 0.05 to 0.5 $cm^3/cm^3$ in pores having a diameter greater than 60 nm. The catalyst is described to preferably have a surface area of between 25 and 200 $m^2/cm^3$. The catalysts used in the examples of which the surface areas have been given, measured according to BET, have a surface area of 100 $m^2/g$ or more.

It has now been found that a higher conversion of nitrogen oxides is observed if a catalyst is used having a surface area measured by nitrogen adsorption, of between 70 and 99 $m^2/g$.

SUMMARY OF THE INVENTION

The catalyst according to the present invention comprises a titania carrier and one or more metal compounds which metals are selected from the group consisting of vanadium, molybdenum and tungsten, which catalyst has a surface area measured by nitrogen adsorption of between 70 and 99 $m^2/g$.

DESCRIPTION OF THE PREFERRED EMBODIMENTS

It is generally thought that a higher surface area will give higher conversions. However, it was unexpectedly found that apparently this rule does not apply to the present catalyst.

The surface area of the catalyst is between 70 and 99 $m^2/g$, preferably between 79 and 99 $m^2/g$. The surface area is to be measured with the help of nitrogen adsorption as described in ASTM method D 3663-92. As long as the contact angle is not known, the surface area can not be derived from mercury intrusion porosimetry data.

The surface area of the catalyst can be influenced by a large number of circumstances. The surface area of the starting material has been found to be important. Further circumstances influencing the surface area have been found to be the degree of peptization of the titania carrier mix before extrusion, and the calcination temperature. The surface area of the starting material is determined by circumstances such as the reaction conditions during preparation, e.g. reaction time and temperature, the peptization conditions and the drying method.

To make that the catalyst has a high surface area, it is necessary to start with a titania carrier having a relatively high surface area. Such carrier will usually have been prepared by dissolving a titania ore in sulfuric acid to obtain a solution containing titanium sulphate. The solution is neutralized, filtered and washed to obtain a metatitanic acid cake. The metatitanic acid cake is optionally peptized and subsequently dried, calcined and pulverized to obtain titania powder useful for preparing a carrier.

Preferably, the titania present in the catalyst is in the form of anatase, as this form of titania generally has a much higher surface area than other forms of titania. Further, the titania carrier will usually contain a relatively small amount of contaminants such as iron compounds and sulphur oxides. It is preferred that the carrier contains less than 10% by weight of contaminants, based on total amount of catalyst. Preferably, the titania carrier comprises less than 5% by weight of sulphur oxides, based on total amount of catalyst.

The expression metal compounds is used herein to indicate that either the metal per se is present or a derivative of the metal. The metal compounds usually present are metal oxides and/or sulfides.

The metal compounds present on the catalyst can be one or more selected from the group consisting of vanadium, molybdenum and tungsten. Preferably, the catalyst contains vanadium. The amount of metal compound, measured as metal, contained by the catalyst can vary between wide ranges. Suitably, the catalyst contains between 0.5 and 10% by weight of metal compounds, preferably between 2 and 6% by weight.

It is customary to use honeycombs when converting nitrogen oxide compounds. The use of honeycombs has the disadvantage that they must have a high crushing strength in order to withstand the gas flow. A high crushing strength will in most cases lead to a relatively low surface area. In the present invention, it is preferred that the catalyst is in the form of trilobes, rifled trilobes or cylinders. The use in the form of a cylinder has the advantage that a cylinder tends to show a better strength than extrudates of a different shape. The catalyst according to the present invention preferably has a cross-sectional diameter of between 0.5 and 5 mm, more preferably a diameter of between 0.5 and 3 mm.

It is important that the catalyst is strong enough to be able to withstand the pressure drop over the reactor. However, generally a strong catalyst has a low surface area while a high surface area catalyst is weak. It was found that catalysts according to the present invention can have a side crushing strength of at least 70 N/cm, usually between 70 and 300 N/cm, measured with the help of testing apparatus Houndsfield type 5000E (Houndsfield is a trademark). These catalysts are of such strength that they are useful for most fixed bed applications.

In order to obtain catalysts of high activity and selectivity, it is preferred that the catalysts have a bimodal pore distribution. Further, it is preferred that the catalysts have more than 90% of the total pore volume present in pores having a diameter of at most 100 nm, which total pore volume is considered to be the pore volume present in pores having a diameter between 1 and $10^4$ nm. A preferred catalyst has a pore volume distribution of the total pore volume present in pores having a diameter between 1 and $10^4$ nm which is such that 60–85% of the pore volume is in pores having a diameter of 5–20 nm, 15–40% is in pores having a diameter of 20–60 nm and less than 5% is in pores having a diameter of more than 100 nm. The pore volume distribution is to be measured with the help of mercury intrusion porosimetry according to ASTM D 4284-92.

The total pore volume of the catalyst preferably is between 0.1 and 1.0 ml/g, more preferably between 0.2 and 0.8 ml/g.

The catalyst according to the present invention can be prepared in any way known to be suitable to someone skilled in the art.

A preferred preparation process comprises:

(a) mixing a titania powder having a surface area of at least 70 $m^2$/g with a peptizing agent, (b) extruding, drying and calcining the mixture of step (a) at a temperature of at most 650° C., (c) contacting the carrier obtained with one or more metal compound(s) which metals are selected from the group consisting of vanadium, molybdenum and tungsten, and (d) calcining the metal compound(s) containing carrier obtained in step (c) at a temperature of at most 600° C.

Further, the present invention relates to a catalyst obtainable by such process.

As described above, the surface area of the final catalyst obtained is influenced i.a. by the pH of the mixture of step (a) and by the calcination temperature in step (b). A preferred pH range for the mixture of step (a) is between 2.0 and 5.0, more preferably between 2.5 and 4.5. The calcination in step (b) is carried out at a temperature below 650° C., preferably at a temperature of at most 600° C., most preferably at a temperature between 350 and 600° C.

In the above process, the titania powder is mixed with a peptizing agent. Useful peptizing agents are organic and inorganic acids. Preferred peptizing agents are oxalic acid, acetic acid and/or nitric acid. More preferably, oxalic acid is used.

To aid in extrusion, conventional extrusion aids can be added such as clay, glass fibers and polyethylene oxide.

Depending on the amount of liquid present in the mixture obtained in step (a), drying of the mixture can be carried out at a temperature between 100 and 150° C. for between 0.5 and 4 hours. Subsequently, the temperature will be raised to the calcining temperature. Calcining will usually be carried out for between 1 and 8 hours, preferably between 1.5 and 6 hours.

In order to obtain the catalyst of relatively high surface area of the present invention, the titania powder has a relatively high surface area. The titania powder to be used in step (a), has a surface area of at least 70 $m^2$/g, measured on the powder before calcination having a loss on ignition of between 10 and 20% by weight. Preferably, the titania powder has a surface area of at least 100 $m^2$/g, more preferably, at least 200 $m^2$/g. A useful method for preparing useful titania powder has been described in EP-B-351270 and in EP-B-389041. A commercially available powder which has been found to be useful is Titafrance G5, which is available from Rhone Poulenc. Titafrance is a trademark.

In step (c), the carrier obtained is contacted with one or more metal compounds of which the metals are selected from the group consisting of vanadium, molybdenum and tungsten. Preferably, the carrier is impregnated with the metal compound(s) by contacting the carrier with an aqueous solution of the metal compound(s). The carrier will usually be impregnated such that the metal compounds are distributed rather evenly over the carrier, i.e. the metal concentration in the outer surface such as the outer 100 micrometer, will be between 0.9 and 1.4 times the concentration of metal throughout the catalyst. A useful solution for impregnating the carrier is an aqueous solution of metal oxalate at a concentration which is appropriate to give the final desired metal oxide content in the catalyst. It is advantageous to impregnate the carrier after extrusion as this gives better utilization of the active component.

Suitable process conditions for the calcination of step (d) are a temperature of between 350 and 550° C. for between 0.5 and 6 hours. Preferably, the calcination of step (d) is carried out at a temperature which is at least 10° C. lower, preferably at least 30° C. lower, than the temperature applied in the calcination of step (b). This has the advantage that the texture of the final catalyst will resemble the texture of the carrier obtained in step (b).

The catalyst according to the present invention is especially useful for use in a process for selectively converting nitrogen oxide compounds, which process comprises contacting a stream containing nitrogen oxide compounds with a reducing compound in the presence of a catalyst according to the present invention.

The process is especially useful for converting nitrogen oxide compounds (NO) present in a gaseous stream of relatively low temperature. The process can be carried out at temperatures such as of between 100 and 400° C., preferably of between 110 and 350° C., more preferably of between 110 and 275° C., most preferably of between 120 and 250° C. The catalyst according to the present invention has the advantage that if applied at such temperature, it still shows good activity and selectivity. The conversion process with the help of the present catalyst can be applied over a very wide range of pressures. Useful pressures are between 0.9 and 20 bar. A useful gas hourly space velocity is between 4000 and 25000 $Nm^3/m^3$/hour (1 $Nm^3$ gas equals 1 $m^3$ at 20° C. and 0.1 MPa).

The catalysts of the invention can be used for treating waste gases containing an amount of nitrogen oxide compounds which can vary widely. They are especially useful for treating waste gases containing 10–10000 ppm by volume of nitrogen oxides, mainly nitrogen monoxide, 1–200 ppm by volume of sulphur oxides, mainly sulphur dioxide, 1–10% by volume of oxygen, 0.5–15% by volume of carbon dioxide and 5–40% by volume of water vapor.

The reducing compound which is preferably present is ammonia or an ammonia releasing compound. It is preferred that the amount of reducing compound present is such that the molar ratio of reducing compound to nitrogen oxide is slightly below the stoichiometrically required ratio.

The present invention is described by the following Examples which are illustrative in nature and are therefore not intended to limit the scope of the invention.

EXAMPLE 1

Titania powder Titafrance DT-51 (Titafrance is a trademark), commercially available from Rhone-Poulenc and having a surface area of 80–100 m²/g, was mixed with an aqueous solution containing 25% by weight of hydrogen peroxide as peptizing agent. The pH of the mix obtained was 2.6.

The mixture was compacted in a Werner and Pfleiderer chamber kneader with sigma arms for about 20 minutes. The mixture obtained was extruded with the help of a single screw Bonnot extruder into 1.7 mm trilobes. The extrudates obtained were dried for at least 4 hours at 120° C., and subsequently calcined for 2 hours at 450° C. The carrier obtained had a side crushing strength of 46 N/cm and a surface area of 87 m²/g.

EXAMPLE 2

Titania powder Titafrance G3 (Titafrance is a trademark), commercially available from Rhone-Poulenc and having a surface area of more than 250 m²/g, was mixed with an aqueous solution containing 5% by weight of acetic acid. The pH of the mix obtained was 2.6. The mixture was compacted in a Werner and Pfleiderer chamber kneader with sigma arms for about 20 minutes. The mixture obtained was extruded with the help of a single screw Bonnot extruder into 1.7 mm trilobes. The extrudates obtained were dried for at least 4 hours at 120° C., and subsequently calcined for 2 hours at 450° C. The carrier obtained had a side crushing strength of 100 N/cm and a surface area measured by nitrogen adsorption of 172 m²/g.

EXAMPLE 3

Titania powder Titafrance G5 (Titafrance is a trademark), commercially available from Rhone-Poulenc and having a surface area of more than 250 m²/g, was mixed with an aqueous solution containing 5% by weight of oxalic acid. The pH of the mix obtained was 3.3. The mixture was compacted in a Werner and Pfleiderer chamber kneader with sigma arms for about 20 minutes. The mixture obtained was extruded with the help of a single screw Bonnot extruder into 1.7 mm trilobes. The extrudates obtained were dried for at least 4 hours at 120° C., and subsequently calcined for 2 hours at 450° C. The carrier obtained had a side crushing strength of 91 N/cm and a surface area of 134 m²/g.

EXAMPLE 4

A vanadium ammonium oxalate solution was prepared by adding ammonia and oxalic acid to ammonium polyvanadate suspended in water. The solution obtained contained 9.4% by weight of vanadium, measured as metal. The carriers obtained in Examples 1–3 were impregnated with the solution and subsequently calcined at 450° C. The catalysts obtained contained 4% by weight of vanadium, calculated as the metal, and contained the titania in the anatase form. The catalysts prepared from the carriers of Examples 1–3 are indicated as catalysts 1–3, respectively. Of the catalysts, 150 mg of the sieve fraction of 0.4–0.6 mm was tested at 140° C. and a pressure of 1 bar using a gas containing 900 ppm NO, 800 ppm $NH_3$, 5% oxygen, 11% water and the remainder being argon. The gas flow was 45 ml/min. The products were analyzed with the help of a mass spectrometer.

What is claimed is:

1. A catalyst comprising a titania carrier and one or more metal compounds which metals are selected from the group consisting of vanadium, molybdenum and tungsten, wherein said catalyst has a surface area measured by nitrogen adsorption of between about 70 m²/g and about 99 m²/g, and wherein the catalyst has a bimodal pore distribution with more than 90% of the pore volume present in pores having a diameter of at most about 100 nm, which pore volume is considered to be the pore volume present in pores having a diameter between about 1 nm and about $10^4$ nm, and which catalyst is obtainable by impregnating the carrier with the metal compound(s) after extruding, drying and calcining the carrier.

2. The catalyst according to claim 1, wherein the catalyst is in a form selected from the group consisting of trilobes, rifled trilobes and cylinders.

3. The catalyst according to claim 1, wherein the catalyst has a side crushing strength of at least 70 N/cm (Newton/centimeter).

4. The catalyst according to claim 1, wherein the catalyst has a surface area of between about 79 m²/g and about 99 m²/g.

5. A process for preparing a catalyst comprising a titania carrier and one or more metal compounds which metals are selected from the group consisting of vanadium, molybdenum and tungsten, wherein said catalyst has a surface area measured by nitrogen adsorption of between about 70 m²/g and about 99 m²/g, and a bimodal pore distribution with more than 90% of the pore volume present in pores having a diameter of at most about 100 nm, which pore volume is considered to be the pore volume present in pores having a diameter between about 1 nm and about $10^4$ nm, which process comprises:

(a) mixing a titania powder having a surface area of at least about 70 m²/g with a peptizing agent, (b) extruding, drying and calcining the mixture of step (a) at a temperature of at most about 650° C., (c) contacting the carrier obtained with one or more metal compound(s) which metals are selected from the group consisting of vanadium, molybdenum and tungsten, and (d) calcining the metal compound(s) containing carrier obtained in step (c) at a temperature of at most about 600° C.

6. The process according to claim 5, wherein the pH of the mixture of step (a) is between about 2.5 and about 4.5.

7. The process according to claim 5, wherein the calcination of step (b) is carried out at a temperature between about 350° C. and about 600° C.

8. A catalyst comprising a titania carrier and one or more metal compounds which metals are selected from the group consisting of vanadium, molybdenum and tungsten, wherein said catalyst has a surface area measured by nitrogen adsorption of between about 70 m²/g and about 99 m²/g, wherein said catalyst has a bimodal pore distribution with more than 90% of the pore volume present in pores having a diameter of at most about 100 nm, which pore volume is considered to be the pore volume present in pores having a diameter between about 1 nm and about $10^4$ nm, and wherein said catalyst is prepared by a process which comprises:

(a) mixing a titania powder having a surface area of at least about 70 m²/g with a peptizing agent, (b) extruding, drying and calcining the mixture of step (a) at a temperature of at most about 650° C., (c) contacting the carrier obtained with one or more metal compound(s) which metals are selected from the group consisting of vanadium, molybdenum and tungsten, and (d) calcining the metal compound(s) containing carrier obtained in step (c) at a temperature of at most about 600° C.

9. A process for selectively converting nitrogen oxide compounds, which process comprises contacting a gaseous stream containing nitrogen oxide compounds with a reducing compound in the presence of a catalyst comprising a titania carrier and one or more metal compounds which metals are selected from the group consisting of vanadium, molybdenum and tungsten, wherein said catalyst has a surface area measured by nitrogen, adsorption of between about 70 m$^2$/g and about 99 m$^2$/g, and wherein the catalyst has a bimodal pore distribution with more than 90% of the pore volume present in pores having a diameter of at most about 100 nm, which pore volume is considered to be the pore volume present in pores having a diameter between about 1 nm and about 10$^4$ nm, and which catalyst is obtainable by impregnating the carrier with the metal compound(s) after extruding, drying and calcining the carrier, at a temperature of between about 120° C. and about 250° C.

* * * * *